April 18, 1961 N. J. HUGGER 2,979,839
TOOL SUPPORT FOR TRACTOR
Filed Aug. 17, 1959 2 Sheets-Sheet 1

INVENTOR.
NORBERT J. HUGGER
BY
Woodhams, Blanchard & Flynn
ATTORNEYS

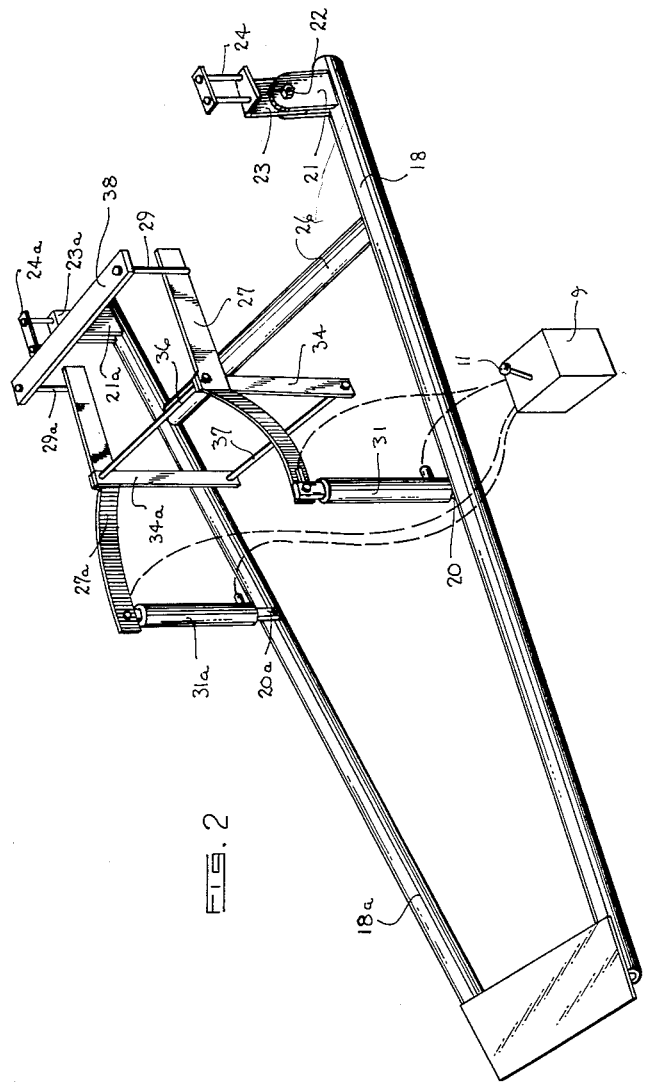

United States Patent Office
2,979,839
Patented Apr. 18, 1961

2,979,839
TOOL SUPPORT FOR TRACTOR
Norbert J. Hugger, 129 S. Homer, Lansing, Mich.
Filed Aug. 17, 1959, Ser. No. 834,133
3 Claims. (Cl. 37—144)

This invention relates to a tool-supporting device for a tractor and particularly to a type thereof which can be quickly mounted or demounted with respect to a standard tractor frame without appreciable, or any, special construction on the tractor frame.

When utilizing tractors for earth or snow moving purposes, it has previously been common practice to mount a suitable earth or snow engaging blade onto various types of frame structure by which the blade is held in a position as selected by the operator. While many of these devices have been developed in the past, and used in a variety of applications, none of them as far as I am aware, has achieved a desirable level of simplicity, economy, ease and accuracy of operation and simplicity and convenience of mounting and demounting.

Since many of these tractor mounted tools are used alternately with other tools by the operator of the tractor, it is highly desirable that the earth or snow moving apparatus with which the present invention is concerned be mountable on or demountable from a standard tractor with a minimum of time consumption and a minimum of inconvenience to, and effort on the part of, the operator of the tractor. The prior art devices, insofar as I am acquainted with them, have usually either been insufficiently sturdy in their mounting on the tractor or they have been undesirably complicated. Such undesirable complexity of mounting has often also included the requirement of special shapes, devices or parts to be used in connection with the tractor, either special construction with respect to the tractor itself or special parts to be welded or otherwise fastened onto the tractor. All of this provides inconvenience and expense and it is the purpose of the present invention to eliminate same.

Accordingly, the objects of the invention are:

(1) To provide means for mounting a hydraulically liftable earth and/or snow removing blade onto a tractor with a minimum of inconvenience and/or modification of the tractor parts.

(2) To provide a blade mounting device as aforesaid which can be mounted on a standard tractor frame without requiring special attaching devices to be built onto the tractor frame.

(3) To provide a blade supporting device as aforesaid which can be applied to the tractor frame easily and quickly and which can be carried out by only one man.

(4) To provide a blade mounting device as aforesaid including frame structure which will engage the frame structure of the tractor firmly and rigidly and which can be applied by the use of only simple tools.

(5) To provide a blade supporting structure for a tractor including a framework generally encompassing the central portion of the tractor frame and capable of doing so with sufficient tightness and rigidity so that the tractor blade will be held firmly in position.

(6) To provide the blade supporting structure for a tractor which will be made of only a few parts, and these parts all of a relatively simple nature, so that there will be a minimum of expense involved in the fabrication of the frame engaging structure concerned, thereby to minimize the cost of the entire blade controlling unit.

(7) To provide a blade controlling unit as aforesaid which is operable directly from the hydraulic system of the tractor and which will be readily controllable therefrom.

(8) To provide a blade mounting structure for a tractor whose manner of installation will be obvious from a mere inspection of the apparatus.

Other objects and purposes of the invention will be apparent to persons acquainted with devices of the general type upon reading of the following specification and inspection of the accompanying drawings.

In the drawings:

Figure 2 is an oblique view of the blade supporting structure apart from the tractor.

Figure 1:
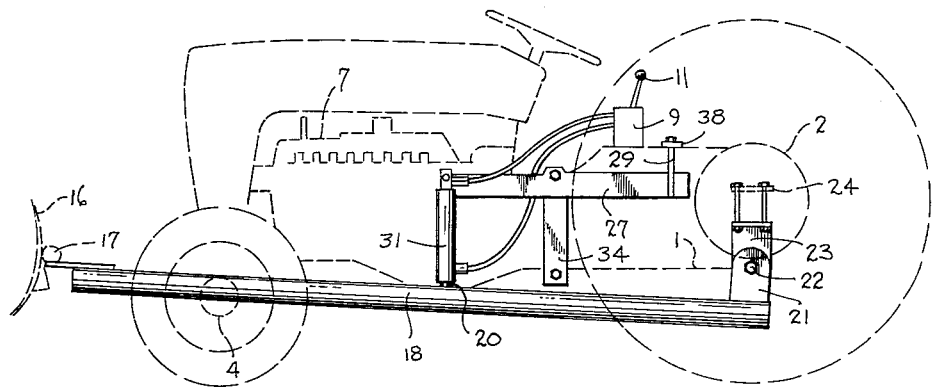
Figure 1 is a side view of the blade supporting structure of the invention and showing the tractor only in broken lines for better showing of the blade supporting structure.
Figure 3:
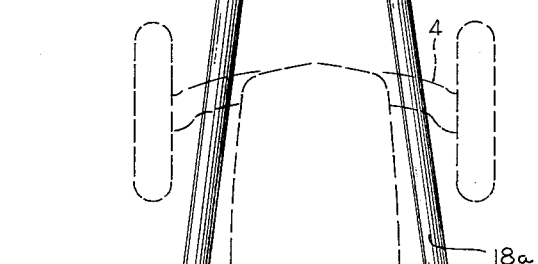
Figure 3 is a top view of the blade supporting structure and again showing the tractor only in broken lines.

In the following description certain terminology will be used for convenience in reference, but it will be understood that such terminology is for reference only and is not limiting. For example, the terms "forwardly" and "rearwardly" and derivatives thereof and words of similar import will refer to the normal direction of movement of the tractor with which the earth or snow moving blade is being used. The terms "rightwardly" and "leftwardly" and derivatives thereof and words of similar import will refer to the rightward or leftward side of the tractor facing forward. The terms "upward" and "downward" and derivatives thereof and words of similar import will refer to directions in the normal position of use of said apparatus and of said tractor.

*General description*

In general, the invention consists of supporting a blade on the forward ends of a pair of long radius arms which are supported at their rearward ends on the rearward axle of the tractor, together with frame structure encircling and clamping the central portion of the tractor frame, and intermediate means by which the radius arms are supported at points thereon forwardly of the rear axle of the tractor. Said intermediate means are preferably adjustable in response to proper application of hydraulic pressure generated by the tractor.

*Detailed description*

Referring now to the drawings in detail, there is shown a tractor of any standard make having a frame 1 of approximately cylindrical form arranged around a generally horizontal axis, a rear axle 2 extending cross-wise from the rear end of the frame structure for supporting drive wheels in the usual manner and having a forward axle 4 arranged cross-wise of the forward end of the cylindrical portion of the frame for supporting the front wheels in the usual manner. The engine 7 is mounted on the forward end of the frame structure in the usual and well-known manner. The tractor is further provided in the usual manner with means for generating hydraulic pressure which means are conventionally utilized for a variety of applications, such as the usual tool lifting mechanism commonly associated with many tractors. Such hydraulic fluid under pressure is in addition to being supplied to the usual tool lifting means (not here shown) is commonly also supplied to a valve 9 which is provided at a convenient point, such as immediately ahead of the driver, on the upper side of the tractor frame. Valve control means 11 are associated with said valve and said valve provides hydraulic fluid under pressure to whatever means are provided for receiving same. Inasmuch as such hydraulic supply is already known and is available from commercial sources, no further description thereof will be needed.

Turning now to the apparatus embodying the invention, and noting that the structure provided on the side of the tractor shown in Figure 1 is duplicated by similar structure on the opposite side of the tractor, it will be sufficient to describe in detail only the apparatus on the left side of the tractor as shown in Figure 1 together with suitable indication of the manner in which the structures on both sides of the tractor are connected with each other. Corresponding parts on the other side of the tractor are identified by the same numerals as those on the left side together with the subscript "a."

Referring now to the figures, a desired tool 16 is mounted through suitable brackets 17 of any conventional nature onto the forward end of a pair of elongated radius arms 18 and 18a. The rearward end of the radius arm 18 supports an upstanding lug 21 which is pivotally connected by a pin 22 of any suitable nature with a downwardly depending lug 23. Said lug 23 is affixed to the axle of the tractor in any convenient manner, by welding if convenient in initial manufacture of the tractor or by a suitable U-bolt clamp 24 as shown in the drawing.

One or more crossbars, one of which appears at 26, may be provided between the radius bars on each side of the tractor for connecting same rigidly together.

The saddle portion of the apparatus is provided very simply by a small number of relatively flat and substantially straight strap-like members.

The side strap 27 is positioned along the side of the tractor frame near its upper edge. Upstanding from the rearward end of said strap is a bolt 29 which is fastened thereto in any convenient manner, such as by welding, and which extends to a point slightly above the horizontal plane of the upper surface of the tractor frame. The forward end of the strap 27 pivotally supports the upper end of a hydraulic cylinder 31 whose plunger is pivotally supported on and with respect to the radius arm 18 on and by the lug 20 extending downwardly from the cylinder 31 and pivoted to the radius arm 18 at a point generally intermediate the forward and rearward ends of the tractor.

A vertical member 34 is rigidly affixed to and extends downwardly from the horizontal member 27.

A tie bolt 36 extends between corresponding parts of the horizontal member 27 and its mate 27a on the opposite side of the tractor and is positioned so that it lies closely against the upper surface of the tractor frame. A similar tie bolt 37 ties together the lower ends of the member 34 and its counterpart 34a on the other side of the tractor. A tie strap 38 extends between the upper ends of the bolt 29 and its counterpart 29a on the other side of the tractor.

Suitable pressure conducting hoses extend from the pressure source at the valve 9 to the upper and lower ends, respectively of the cylinders 31. Similar hoses extend from said valves to the corresponding cylinder 31a on the rightward side of the tractor.

*Assembly and operation*

To assemble the apparatus of the invention into operating position on a tractor, the device is permitted to rest on the ground in a convenient location and the tractor driven over it, with both front and rear wheels straddling the frame structure including the radius arms 18 and 18a. The rearward ends of the radius arms are then lifted and the pins 22 and 22a inserted to pivotally attach the lugs 21 and 21a to the downward extending lugs 23 and 23a. With the strap 38 and the tie bolt 36 both removed and the forward ends of the radius arms remaining on the ground, the saddle structure is then lifted upwardly until said strap and tie bolt can be inserted into place as shown. They are then fastened snugly into place by re-application of the several nuts associated with the bolts 29 and 29a and with the tie bolt 36. The pressure fluid conduits are then affixed appropriately to the connections on the valve 9 and the apparatus is ready for operation.

By introducing pressure fluid through the pressure fluid conduits to the lower end of the piston 31 and its counterpart 31a on the other side of the tractor, the plunger is caused to move upwardly, thereby lifting the radius arms and correspondingly lifting the blade. By effecting opposite flow of the pressure fluid, the plunger in said cylinders moves downwardly and results in corresponding downward movement of the radius arms and of the blade. Thus, the blade can be moved positively in either direction under hydraulic pressure so that it can be lifted upwardly against gravity, or moved downwardly to dig into earth or snow, as desired by the operator.

When it is desired to remove the apparatus from the tractor, the tool 16 is preferably first permitted to nest on the ground after which the tie bolt 36 and the strap 38 are removed, thereby permitting the saddle to drop to the ground. The pressure fluid lines are disconnected from the valve structure and the pivot pins 22 and 22a are removed. The structure is then fully disconnected and the tractor can be backed off from the device and used for other purposes.

While a particular preferred embodiment of the invention has been described above, it will be understood that the invention contemplates such changes or modifications therein as lie within the scope of the appended claims.

What is claimed is:

1. A device for attaching a blade to a tractor comprising the combination: an elongated frame structure of such length that it can extend from a point under the rear axle of the tractor with which it is to be used to a point forwardly of the front axle thereof, and means supporting said blade on the forward end of said frame structure; means attachable to the rear axle of said tractor for pivotally supporting the rear ends of said frame structure on and with respect to said rear axle; a saddle secured to said frame structure and adapted for fastening said frame structure to the frame of the tractor, said saddle including upstanding elements on opposite sides of said frame structure and a plurality of transverse elements extending between said upstanding elements and encircling the central portion of the frame of said tractor, selected ones of said transverse elements being detachable from said upstanding elements so that said frame structure may be disposed around the tractor frame by a vertical movement with respect thereto; and pressure fluid responsive means supported on said saddle and connected to said frame structure at a point intermediate the forward and rearward ends thereof; means connecting said pressure fluid responsive means to a controllable source of fluid pressure.

2. The device defined in claim 1 wherein said upstanding elements of said saddle comprise a pair of substantially parallel elongated straps which are adapted to extend along opposite sides of the tractor frame, and said transverse elements extend between said straps above and below said tractor frame for encircling same and tightly gripping said tractor frame, and said pressure fluid responsive means being connected to said straps adjacent the forward ends thereof.

3. The device defined in claim 1 wherein said upstanding elements of said saddle include a pair of elongated horizontal straps arranged substantially parallel with respect to each other and positionable on either side of a tractor frame, a pair of depending straps extending downwardly from a point near the midpoint of said horizontal straps to a point below the lowermost extent of said tractor frame, a detachable tie bolt extendable across the top of the tractor frame connecting said horizontal straps and another tie bolt connecting the lower ends of said depending straps for holding same snugly against the sides of the tractor frame, a pair of upstanding threaded members extending upwardly from the rearward ends of the horizontal straps and a detachable cross member connecting said upwardly extending threaded members and means on said threaded members holding said strap snugly against the upper surface of said tractor frame, and means at the forward ends of said horizontal straps for supporting the pressure fluid responsive devices.

References Cited in the file of this patent

UNITED STATES PATENTS

| | | |
|---|---|---|
| 1,856,629 | Geister | May 3, 1932 |
| 2,485,139 | Coats | Oct. 18, 1949 |
| 2,622,500 | Hugger | Dec. 23, 1952 |
| 2,725,650 | Crawford | Dec. 6, 1955 |

FOREIGN PATENTS

| | | |
|---|---|---|
| 149,106 | Australia | Nov. 19, 1952 |